3,458,551
PROCESS FOR PREPARING METAL-ORGANIC COMPOUNDS OF THE GROUP V (ARSENIC ANTIMONY AND BISMUTH) OF THE PERIODIC SYSTEM OF ELEMENTS
Richard Muller and Christian Dathe, Radebeul, Germany, assignors to Institut fur Silikon- und Fluorkarbon-Chemie, Radebeul, Germany
No Drawing. Filed Nov. 21, 1966, Ser. No. 595,623
Int. Cl. C07f 9/70, 9/90, 9/94
U.S. Cl. 260—440         9 Claims

ABSTRACT OF THE DISCLOSURE

Process for preparing compounds of the type stated in the title, wherein an organotrifluoro silane or an organofluoro silicate is reacted with a halide.

---

The invention relates to a process for preparing metal-organic compounds of the group V–b of the periodic system of elements.

It is known that organotrifluoro silanes may be used for the purpose of adding organo groups to salts of heavy metals. Thus, in German Patents 41,610 and 42,275 of the assignee, processes have been described by which silver, mercury, copper or gold are reacted with organotrifluoro silanes or organofluoro silicates whereby more or less stable metal-organo compounds may be obtained.

It has now been found, unexpectedly, that halogen compounds of the elements of group V–b of the periodic system, for example $SbF_3$, $SbCl_3$, $BiF_3$, $AsF_3$, are capable of reacting with organotrifluoro silanes or organofluoro silicates with formation of the corresponding metal-organic compounds. The reaction may be effected in water; however, the addition of solution promoters, such as alcohol, makes the reaction occur more readily, but is not absolutely required.

The reaction of the organotrifluoro silane will also occur when, e.g. to an antimony trifluoride solution, alkali metal fluorides or hydrofluoric acid are added, or when one starts with alkali metal fluoroantimonates (III), for instance, ammonium pentafluoroantimonate (III). Instead of the halides, double salts may be used, such as $LiCl.SbF_3$, $3KNO_3.SbF_3$ or $(NH_4)_2.SO_4.SbF_3$, which can also be considered as complex salts, e.g. $Li[SbF_3Cl]$. Futhermore, instead of the halides, oxides may be used, for instance $Sb_2O_3$ and $As_2O_3$, or hydroxides, e.g.

$$Bi(OH)_3$$

if operation is carried out in the presence of a hydrogen halide, such as HF or HCl.

Volatile organotrifluoro silanes, e.g. $CH_3SiF_3$ (B.P. −30° C.) is added preferably in the form of the fluoro silicates, e.g. $(NH_4)_2[CH_3SiF_5]$. In this reaction, no organotrifluoro silane escapes as would be expected, in spite of the acid reaction of, e.g., the $SbF_3$ solution; instead, the organo stibine deposits as oil beneath the aqueous layer, and may easily be separated, or may be converted into the corresponding organoantimony(V)dihalides by oxidation with halogen solutions, e.g. methanolic bromine solution.

Instead of the organotrifluoro silanes. other trifunctional organosilanes may be used (e.g. organotrichloro silanes, organotri-alkoxy silanes, organotri-acetoxy silanes, mono-organo-hydrogensilanes), organosiloxanes or polysilanes, provided that they may be converted to organotrifluoro silanes by means of hydrofluoric acid or other fluoridation agents added to the reaction mixture, such as alkali metal or ammonium fluoride.

The process according to the invention is distinguished primarily by the fact that it may be carried out in water, whereby the risk of fire can be avoided, which may be caused by the inflammability, for instance, of the trialkyl stibines or trialkyl arsine when in contact with the oxygen of the air. Moreover, it is possible to use, for the preparation primarily of methyl and phenyl derivatives, the waste and by-products hitherto almost useless in the recovery of silicones.

According to the invention it is further possible to produce, in a simple manner, compounds previously not prepared, such as diphenylantimony(III)fluoride.

The products made in accordance with the invention are used especially as pharmaceuticals, pesticides, and intermediates in the chemical and pharmaceutical industries.

In the following, the invention will be more fully described in a number of examples, but it should be understood that these are given by way of illustration and not of limitation.

Example 1

To 52 g. (300 mmol) ammoniummethylpentafluoro silicate in 180 ml. water, 98 g. of a 20% aqueous solution of antimony trifluoride were added, which caused gradual turbidity. Over night, trimethylstibine was formed, an oil which smells of garlic and is immediately inflammable in air; it was dissolved in methanolic bromine solution. A salt is precipitated which proved to be $(NH_4)_2[SiF_6]$. Recrystallization from water yields 63.3% F, calc. 63.99%; crude output: 43 g., 79%. From the filtrate to which bromine was added, and which was evaporated to dryness, trimethylantimony(V)-dibromide could be extracted with ethanol.

*Analysis.*—$C_3H_9Br_2Sb$ (326.7) calc.: 11.03% C; 2.78% H; 48.92% Br; 37.27% Sb. Found 11.9% C; 3.1% H; 49.0% Br; 36.5% Sb.

Example 2

To 50 g. of a $NH_4F$ solution containing 22.5 g. (625 mmol), we added drop by drop 50 g. (310 mmol) phenyltrifluoro silane while cooling with ice. After having diluted the formed mash with 155 ml. 2% $NH_4F$ solution, and after having taken it out of the cooling bath, a solution of 27 g. (150 mmol) $SbF_3$ in 82 g. water was added. Over night, a crude yield of 19 g. (43%) diphenylantimony (III)fluoride had formed. M.P. 157–158° C., after recrystallization from ethanol. F. found 6.0%, calc. 6.44%.

Example 3

126 g. (500 mmol) ammoniumpentafluoro antimony (III), $(NH_4)_2[SbF_5]$ and 37 g. $NH_4F$ (1 mol) were dissolved in 275 ml. water and 162 g. (1 mol) phenyltrifluoro silane were added drop by drop thereto. Heating set in spontaneously and salt was precipitated; the deposit was removed by suction after 60 hours and dried. Yield 168 g. With 400 ml. boiling ethanol, 50 g. (34%) diphenylantimony(III)fluoride were brought into solution. M.P. 160 to 161° C.

*Analysis.*—$C_{12}H_{10}FSb$ (295.0) calc.: 48.86% C; 3.42% H; 6.44% F; 41.28% Sb. Found: 48.0% C; 3.6% H; 6.3% F; 41.9% Sb. The salt insoluble in alcohol was $(NH_4)_2[SiF_6]$ (80 g., F found 63.8%, calc. 63.99%).

Example 4

36 g. (200 mmol) phenyltrifluoro silane were shaken with 54 g. (300 mmol) $SbF_3$ in a wide-neck polyethylene flask in 100 ml. water. Slight spontaneous heating occurred and diphenylantimony(III)fluoride formed in needle-shaped crystals, which were removed by suction after 24 hours, washed with water, and dried; yield: 20 g. (68%). When recrystallized from acetone, only a small amount of insoluble impurities remained. Fluorine contents of the pure compound 6.4%, calc. 6.44%.

When the test was repeated with addition of 100 ml. ethanol, 41 g. of a partly crystalline precipitate was obtained, from which SbOF could be dissolved by treatment with hydrofluoric acid. 23 g. (78%) remained as well-shaped crystals of diphenylantimony(III)fluoride; M.P. 160° C.

Example 5

To a solution of 27 g. (150 mmol) SbF$_3$ in 68 g. of hydrofluoric acid containing 18 g. (900 mmol) HF, 50 g. (310 mmol) of phenyltrifluoro silane were added dropwise and the precipitated diphenylantimony(III)-fluoride was removed by suction after 20 hours. Crude yield: 17.5 g. (36%). After recrystallization from ethanol, the melting point was 157 to 159.5° C.

*Analysis.*—C$_{12}$H$_{10}$FSb (295.0) calc.: 48.86% C; 3.42% H; 6.44% F; 41.28% Sb. Found: 49.4% C; 3.7% H; 6.5% F; 41.4% Sb.

In a further test with addition of 100 ml. ethanol, diphenylantimony(III)fluoride was obtained in the form of coarse, very pure crystals. Yield: 48% (fluorine content after recrystallization from acetone 6.4%, calc. 6.44%).

Example 6

48 g. (200 mmol) phenyltriethoxy silane were dropped into an ice-cooled aqueous solution of 18 g. (100 mmol) SbF$_3$ in 50 g. 40% hydrofluoric acid (1000 mmol) while vigorously shaking. Diphenylantimony(III)fluoride was precipitated in pure form. Yield: 15 g. (50%). Melting point: 159 to 161° C.

Example 7

In a platinum bowl, 10 ml. 40% aqueous hydrofluoric acid (200 mmol) and 70 g. 32% aqueous NH$_4$F solution (610 mmol) were heated together with 13 g. (50 mmol) bismuth hydroxide; then 24.5 g. (150 mmol) phenyltrifluoro silane were slowly added with no supply of external heat but with stirring, the mixture becoming spontaneously heated to a marked degree. Oil separated at the surface of the liquid and solidified when cooled on a water bath. After filtration, the residue was dried and with ether 11 g. triphenylbismuth compound (50% calc. on Bi(OH)$_3$)) could be separated from insoluble ingredients. Melting point after recrystallization from ethanol 78° C. )conforming to (C$_6$H$_5$)$_3$Bi according to publications).

*Analysis.*—C$_{18}$H$_{15}$Bi (440.3) calc.: 49.09% C; 3.43% H; 47.48% Bi. Found: 49.2% C; 3.6% H; 47.4% Bi.

Example 8

To 35 g. SbCl$_3$ in 90 g. 45% ammonium fluoride solution and 70 g. water, 50 g. phenyltrifluoro silane were dropped in the course of 40 minutes; the mixture became heated and white precipitates occurred (53 g.) which were removed by suction after standing over night; the precipitate was washed with boiling acetone, dried, and the 41 g. of solid thus obtained was boiled with 150 ml. water and again subjected to suction. From the aqueous filtrate, 13.5 g. cube-shaped crystals separated and when the liquid was concentrated, 6 g. of a crystalline mass was obtained which, after recrystallization from a large amount of gasoline, had a melting point of 174° C. and proved to be an organo-antimony compound having a strong irritating effect on mucous membranes.

*Analysis.*—53.2 Sb; 41.6% C; 3.2% H (still containing Cl and F).

Example 9

41 g. phenyltrichloro silane were added dropwise in the course of 25 minutes to a solution of 20 g. SbF$_3$ in 50 g. 40% hydrofluoric acid, which was diluted with 20 g. water and 100 ml. ethanol, and cooled in an ice bath. A clear solution was thus obtained which upon addition of 250 g. 40% hydrofluoric acid separated an oil which crystallized upon separation; with 25 ml. ether an organo-antimony compound could be dissolved therefrom. After recrystallization from gasoline and ether, the melting point of the compound was 156 to 161° C. and it contained, in addition to Sb, Cl and F, 46.7% C and 3.7% H.

Example 10

To a solution of 40 g. SbF$_3$ in 40 g. water, 35 g. conc. HCl, and 100 ml. ethanol, 32 g. phenyltrifluoro silane were added; an oil separated from the mass, which partly solidified at −5° C. and from which a crystalline substance (12 g.) could be separated and dried over P$_2$O$_5$. The stinging odor made it recognizable as organo-antimony compound.

*Analysis.*—44.9% Sb; 29.5% C; 2.12% H; 10.8% Cl; and 3.8% F.

Example 11

89 g. (100 mmol) of a 20% aqueous solution of antimony trifluoride are mixed with 56 g. (300 mmol) (NH$_4$)$_2$[CH$_2$=CHSiF$_5$] dissolved in 180 ml. water, whereby trivinylstibine is deposited over night at the bottom as an oily layer. Then a solution of 16 g. (100 mmol) Br$_2$ in 50 ml. chloroform was added drop by drop while stirring, the addition taking 5 hours. An oily bottom layer of slightly yellow coloring is separated, the aqueous portion once extracted with chloroform, and the combined solutions of chloroform dried over Na$_2$SO$_4$. After the evaporation of the chloroform, trivinylstibine dibromide (C$_2$H$_3$)$_3$SbBr$_2$ distills, with part decomposition, at a B.P.$_{.7}$ of 128° C. (literature: B.P.$_{.2}$=117° C.); obtained 5 g. (14%).

*Analysis.*—Br calc.: 44.07%. Found: 45.7%.

Example 12

171 g. (0.9 mol) vinyltriethoxy silane are stirred for 2–3 hours while being cooled by water, with 54 g. (0.3 mol) antimony trifluoride and 342 g. 25% NH$_4$HF$_2$ solution (1.5 mol). The precipitate formed while standing over night is washed with a slight amount of methanol, then ether, and the filtrate likewise extracted with ether. The methanol and ether extracts are combined, dried over Na$_2$SO$_4$, and to the distillate obtained therefrom in a weak current of nitrogen up to 75° C., we add, at a temperature of 0–5° C., a 10% iodine solution in ether until yellow coloring remains. The solvent is then distilled off and from the liquid residue remaining, 22 g. 15% trivinylstibine iodide (C$_2$H$_3$)$_3$SbI$_2$ is precipitated on cooling to −10° C. in the form of yellow crystals, having a melting point of 35–36° C. after re-crystallization from methanol (literature: 35–37° C.); C$_6$H$_9$I$_2$Sb (457) calc.: C, 15.78%; H, 1.99%; Sb, 26.66%. Found 15.8% C; 2.1% H; 26.5% Sb.

Upon renewed cooling of the mother liquor to −78° C., a colorless powder precipitates over night in fine crystals, which after re-crystallization from acetone were determined to be bis-trivinylstibine iodide oxide (CH$_2$=CH)$_3$SbI—O—ISb(CH=CH$_2$)$_3$ obtained were 4 g. (4%) of the compound, analytically pure.

*Analysis.*—C$_{12}$H$_{18}$I$_2$OSb$_2$ (676) calc.: C, 21.33%; H, 2.69%; I, 37.57%; Sb, 36.04%. Found: 21.3% C; 2.5% H; 38.6% I; 35.3% Sb.

Molecular weight: 720 (ebullioscopically in benzene). The substance is well soluble in chloroform, benzene, acetone, methanol and water, not in gasoline. It decomposes without melting above 260° C.

While certain embodiments of the invention have been described, it should be understood that the foregoing disclosure relates only to preferred embodiments which are intended to include all changes and modifications of the examples described within the scope of the invention as set forth in the appended claims.

What we claim is:

1. A process for preparing metal-organic compounds of the group V–*b* of the periodic system of the elements, which comprises reacting an organotrifluoro silane of the formula $RSiF_3$ or an organofluoro silicate of the formula $M_2(RSiF_5)$, or of the formula $M(RSiF_4)$, wherein R stands for alkyl, alkenyl or aryl, and M for a monovalent radical, with a halide selected from the group consisting of a fluoride, a chloride and a bromide of said element.

2. The process as defined in claim 1, wherein the halides of said elements are formed during the reaction.

3. The process as defined in claim 2, wherein an oxide or hydroxide of a group V–b element and a hydrogen halide are reacted with the organotrifluoro silane or organofluoro silicate.

4. The process as defined in claim 1, wherein the reaction is carried out in aqueous solution.

5. The process as defined in claim 1, wherein a compound is added to the halide of one of the elements of group V–b, which added compound is selected from the group consisting of ammonium fluoride, alkali metal fluoride, and hydrofluoric acid.

6. The process as defined in claim 1, wherein the halide used is a trifluoride of an element of the group V–b.

7. The process as defined in claim 1, wherein the compound reacted with the organotrifluoro silane or organofluoro silicate is a complex alkali metal salt or ammonium salt of a halide of a group V–b element.

8. The process as defined in claim 1, wherein the organotrifluoro silane or organofluoro silicate is made in situ.

9. The process as defined in claim 1, wherein alcohol is added to the reaction as a solution promoter.

References Cited

UNITED STATES PATENTS

| | | | |
|---|---|---|---|
| 2,950,306 | 8/1960 | Smith | 260—440 |
| 2,964,550 | 12/1960 | Seyferth | 260—440 |
| 3,024,238 | 3/1962 | Olah et al. | 260—440 X |
| 3,031,425 | 4/1962 | Schoepfle et al. | 260—446 X |
| 3,061,647 | 10/1962 | Jenkner | 20—440 X |
| 3,072,697 | 1/1963 | Jenkner | 260—440 X |
| 3,100,217 | 8/1963 | Bartocha | 260—440 X |
| 3,366,655 | 1/1968 | Weingarten et al. | 260—446 |

TOBIAS E. LEVOW, Primary Examiner

W. F. W. BELLAMY, Assistant Examiner

U.S. Cl. X.R.

260—446, 447, 999